United States Patent [19]

Soyack

[11] 4,456,790
[45] Jun. 26, 1984

[54] AUTOMATED HARDWARE INVENTORY SYSTEM

[75] Inventor: Richard F. J. Soyack, Red Bank, N.J.

[73] Assignee: Bell Telephone Laboratories, Incorporated, Murray Hill, N.J.

[21] Appl. No.: 346,649

[22] Filed: Feb. 8, 1982

[51] Int. Cl.³ .................... G06F 13/00; G06F 15/24; H04Q 3/54; H04Q 9/02
[52] U.S. Cl. ........................ 179/18 ES; 235/385; 340/825.08
[58] Field of Search .............. 364/403, 200, 900; 370/86, 91, 90, 96, 92; 235/385; 179/2 A, 7.1 TP, 7.1 R, 7 R, 8 R, 18 ES, 99 M, 175.2 C, 18 FH; 340/825.08, 825.34, 825.54

[56] References Cited

U.S. PATENT DOCUMENTS

| | | | |
|---|---|---|---|
| 3,509,539 | 4/1970 | Fichten et al. | 364/900 |
| 3,519,757 | 7/1970 | Anderson et al. | 179/18 J |
| 3,633,166 | 1/1972 | Picard | 370/86 |
| 3,702,008 | 10/1972 | Groth | 370/96 X |
| 3,728,681 | 4/1973 | Fuller et al. | 370/86 |
| 3,755,782 | 8/1973 | Haas et al. | 340/825.08 |
| 3,767,863 | 10/1973 | Borbas et al. | 179/18 ES |
| 4,000,378 | 12/1976 | Caplan | 370/90 |
| 4,180,204 | 12/1979 | Koenig et al. | 235/385 |
| 4,204,636 | 5/1980 | Hayman | 235/383 |
| 4,325,146 | 4/1982 | Lennington | 455/604 |
| 4,373,181 | 2/1983 | Chisholm et al. | 364/200 |

FOREIGN PATENT DOCUMENTS

| | | | |
|---|---|---|---|
| 55-82552 | 6/1980 | Japan | 370/90 |
| 1549191 | 7/1979 | United Kingdom | 364/403 |

OTHER PUBLICATIONS

"Production Counting Using a Computer Network", By Knoop and Loessel, Intern'l. Telemetering Conference, Los Angeles, Calif., Sep. 1976, pp. 721-727.

Primary Examiner—Thomas W. Brown
Attorney, Agent, or Firm—David H. Tannenbaum; Ronald D. Slusky

[57] ABSTRACT

There is disclosed an automated hardware inventory system for remote identification of system circuits. The system includes a central processing unit for addressing circuits over a bidirectional communication bus. A memory device and control circuitry is affixed to each circuit for the storage of information to identify each said circuit when addressed by the central processing unit. The identity information includes the vintage of the circuit.

1 Claim, 3 Drawing Figures

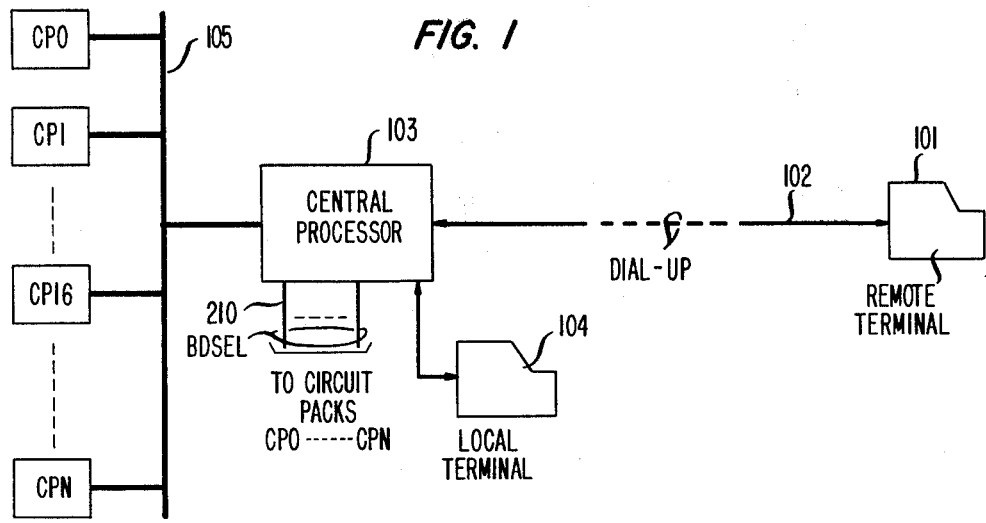

AUTOMATED HARDWARE INVENTORY SYSTEM

BACKGROUND OF THE INVENTION

The present invention relates to the art of inventory systems, more particularly, to an automated hardware inventory control system having remote readout.

Heretofore, the process of inventorying apparatus, such as PBX equipment located on a telephone customer's premises, required dispatching a craftsperson to the site of the equipment to physically inventory the equipment. The expense of performing an inventory in this manner is costly and several methods have been devised to reduce this cost. These methods use various coded labels appended to an exposed surface, such as a face plate, of the apparatus. The coded labels generally are of the bar coded variety which can be scanned by a craftsperson using a hand held scanning device. While these methods facilitate the inventory process, they do not eliminate the cost of dispatching a craftsperson to the site of the equipment.

SUMMARY OF THE INVENTION

I have designed an automated hardware inventory system which uses the central control processing capabilities of a stored program telephone switching system, such as a digital PBX, for remotely inventorying equipped plug-in-type circuits located on a customer's premises. The system includes a central processing unit for addressing the equipment over a common bidirectional communication bus. A memory device and control circuitry is affixed to each plug-in type circuit for the storage of sufficient information to identify the circuit when addressed by the central processing unit.

Using my arrangement, it is possible to automatically and remotely inventory hardware, such as circuit packs, associated with stored program control telephone switching systems or with any computerized system. Thus, the labor costs associated with performing manual inventories are virtually eliminated.

BRIEF DESCRIPTION OF THE DRAWING

These and other objects and features, together with the operation and utilization of the present invention, will be more fully apparent from the illustrative embodiment shown in conjunction with the drawing in which:

FIG. 1 is a broad block diagram showing an automated hardware inventory system with an option for remote or local polling, FIG. 2 is a block diagram showing a circuit arrangement for the identification of a circuit pack in communication with the bidirectional bus, and FIG. 3 is a layout of bit assignments for sufficiently identifying a circuit.

DETAILED DESCRIPTION

FIG. 1 illustrates a system arrangement for automatically inventorying hardware, either remotely using remote terminal 101, or locally using local terminal 104. From the remotely located terminal 101 a craftsperson establishes a bidirectional communication link 102 between remote terminal 101 and central processor 103 located on the customer's premises. While a dial-up telephone connection for establishing the bidirectional communication link 102 is shown, it is well recognized in the art that a communication link can be established by a variety of methods, such as, for example, a private telephone line.

Upon establishing a communication connection with central processor 103, the craftsperson inputs a series of appropriate instructions via remote terminal 101 to central processor 103 via communication link 102. These instructions serve to direct central processor 103 to a particular circuit pack or to all circuit packs. In the instance where the identity of one or of a specified number of circuits is known the craftsperson inputs to the central processor 103 the addresses of that circuit or circuits. For PBXs and the like the address of a circuit can, for example, be the physical mounting location of the circuit within the PBX arrangement.

For example, the instruction inputted by the craftsperson could include several data fields for specifying entry parameters. The first entry parameter would identify the software inventory program and directs central processor 103 to invoke that program.

Upon being invoked, the inventory program accepts the next entry parameters inputted by the craftsperson. The following entry parameters direct the inventory program to a particular circuit, to a class of circuits, to a group of circuits, or to all circuits.

An entry parameter for directing the inventory program to a particular circuit can, for example, be the physical mounting location of the circuit within a PBX arrangement. The entry parameter for directing the inventory program to a group of circuits can, for example, be the cabinet number, frame number, module number, or mounting place number within a PBX arrangement. For a particular class of circuits, such as input or output circuits, the entry parameter can, for example, be the equipment type. A global parameter, such as, for example, the word "ALL", could be used to direct central processor 103 to initiate a procedure for inventorying all circuits.

The inventory program could be arranged to verify the validity of each entry parameter against an appropriate translation table (not shown) by using a search algorithm. If the entry parameter is invalid, the inventory program, for example, could send an error message to the originating terminal and then exit. Otherwise, the inventory program could continue processing the entry parameter.

In the instance where the entry parameter does not describe the location of circuit pack 106, the inventory program reassembles the entry parameter into an index for indexing a translation table to obtain the location of the circuit pack. The translation table (not shown) could be, for example, sequential memory locations containing at least the class, physical location, and address for each circuit 106. An entry parameter describing a particular class or type of circuit 106 causes the inventory program to search through the translation program and poll each circuit 106 matching the entry parameter.

An entry parameter describing a particular frame or module causes the inventory program to search the translation table for the first circuit 106 assigned to the particular frame or module and poll sequentially each circuit identified by the translation table as being assigned to the particular frame or module.

An entry parameter describing "ALL" causes the inventory program to start at the beginning of the translation table and sequentially poll each circuit 106 listed in the translation table.

The entry program stores each byte of identifying information received from a polled circuit, and upon receiving the last byte of information recompiles and assembles the information into a meaningful display for transmission to the originating terminal.

Central processor 103 communicates with each circuit via the common bidirectional communication bus 105. Since common bidirectional bus 105 is common to all circuits, each circuit, such as circuit 106, is arranged to detect its own address appearing on bus 105. In one arrangement, the common bidirectional bus 105 includes an address bus (not shown).

An address register comprised of flip-flops, AND gates, or other appropriate semiconductor devices affixed to each circuit to be inventoried (not shown) but located within PROM control circuit 208 (FIG. 2) communicates with the address bus and responds to its particular address. Upon detecting its own address placed onto the address bus by central processor 102, the address register enables its respective circuit 106 to accept data placed onto the bidirectional bus 105 by central processor 103.

An alternative method of enabling circuit 106 to accept data placed onto bus 105 by central processor 103 is to connect (hard wired) an enable lead 210, shown in FIG. 2, between central processor 103 and each circuit pack CP0-CPN to be inventoried. In this manner, central processor 103 has direct control as to which circuit accepts data placed onto bus 102. Also, this alternative arrangement eliminates the need to include an address bus.

FIG. 2 illustrates circuitry that is affixed to each circuit pack in order to identify the circuit. The circuitry affixed to each circuit pack, such as circuit pack 106 (CP0), comprises Programmable Read Only Memory (PROM) 207, which typically can be Texas Instruments chip TBP 18SA030, and prom control circuit 208, which typically can be Texas Instruments chip SN74LS373 or chip SN74LS374. It is recognized that a different memory device, such as a read only memory (ROM) device or a register comprised of flip-flops or switches, could be readily substituted for PROM 207 without departing from the scope of the invention.

Bus drivers (not shown) which typically can be Texas Instruments chip SN74LS24 or INTEL chip 8286, can be used to interface central processor 103 to bus 105 and to interface each circuit 106 to bus 105.

FIG. 3 illustrates a typical memory layout of PROM 207 which includes four bytes of eight bits each for the storage of various fields of information pertaining to the identification of circuit 106.

To inventory circuit 106 central processor 103 places the memory address for byte 0 of PROM 207 onto bus 105, and then enables the BDSEL lead 210 of the target circuit 106. Enabled circuit 106 accepts the address information from bus 105 and latches this information into prom control circuitry 208. The processor then removes the address information from bus 105 and immediately prepares itself to receive the 8-bit contents of byte 0 of PROM 207 of target circuit 106.

Prom control circuit 208 decodes the binary address for byte 0 which was received from the processor over bus 105 and addresses PROM 207 at that location, thereby directing PROM 207 to place the contents of byte 0 onto bus 105. Central processor 103 accepts the contents of byte 0 from bus 105 and stores the information in an appropriate memory location. Central processor 103 then disenables the BDSEL lead 210 of the inventoried circuit 206 in preparation for addressing byte 1 of PROM 207 of circuit 106 and for clearing PROM control circuit 208.

On the next cycle, central processor 103 places the binary address for byte 1 onto bus 105 and again enables the BDSEL lead 210 for latching the new address of byte 1 into PROM control circuitry 208. As described immediately above, the PROM control circuit decodes the binary address for byte 1 and again addresses PROM 207. Upon being addressed, PROM 207 places the contents of byte 1 onto bus 105 for acceptance by central processor 103 for storage with the previously received bits of byte 0.

Central processor 103 applies this addressing procedure twice more to obtain the contents of bytes 2 and 3 of PROM 207 of the inventoried circuit 106. Upon receiving the four bytes of information from PROM 207, the inventory program invoked by central processor 103 reassembles and recompiles the four bytes received from PROM 207 to give a meaningful display of the identifying information. Central processor 103 then communicates the recompiled identifying information to the originating terminal for display.

It should be understood that a PROM having a matrix of 16 bits by n words could be readily substituted for PROM 207, thereby reducing to two the number of times that PROM 207 must be addressed. It is also recognized that PROM 207 can be cascaded to produce a word length of 16 bits, with a corresponding increase in the size of bidirectional communication bus 105, to reduce to one the number of times that PROM 207 needs to be addressed. Also, the memory could be arranged with appropriate control so that upon presentation of a single address the memory will cycle through each stored word.

The byte fields of PROM 207 are encoded to obtain the identity of circuit 106. The bit fields illustrated in FIG. 3 define the circuit numerical code, letter suffix, vintage and series. The circuit numerical code is determined from the bit fields labeled block number and offset, and the current vintage of the circuit is identified by the bit fields labeled original vintage and vintage update.

The bit field labeled block number is a binary representation of an index which is used to index a list of block numbers representing ranges of alphanumerical codes. For example, the first block number could represent a range of numerical codes starting at SN 220, the second block number then could represent a range of numerical codes starting at TN 366, while the third block number could represent a range of numerical codes starting at TN 491. The offset is a binary representation of a decimal number which is added to the circuit base code determined from the block number to yield the circuit numerical code. In the instance where circuits are not identified by an alphanumerical code the block number field and offset field can be combined to provide a binary representation of a numerical code or alphabetical code of the circuit directly.

The original vintage bit field is a binary representation of circuit vintage at the time of manufacture. The vintage update field is a bit position representation, starting with the least significant bit, for indicating vintage update.

PROM 207 is programmed at the time of manufacture in accordance with the bit layout illustrated in FIG. 3 to reflect the identity of circuit pack 106. As improvements are added to circuit pack 106, the vintage update bit field is reprogrammed to reflect the latest version of the circuit 106. PROM 207 can be reprogrammed in the field using conventional means, or alternatively, additional control and timing circuitry can be readily added to circuitry 208 to permit central processor 103 to program PROM 207, either automatically or at the direction of a craftsperson communicating with central processor 103 via one of the terminals.

Central processor unit 103 typically comprises an arithmetic logic unit, registers, program memory, program counter, external memory, control circuit, internal address and data bus, and one out of n decoders for controlling the BDSEL leads. Central processor unit 103 operates in a fashion similar to any typical general purpose computer and could be assembled from commercially available electronic components such as, for example, INTEL chip 8086 or Motorola chip series M5800, or could be any electronic or electromechanical telephone processor, such as the Bell System's Dimension communication system.

Bus 105 can be arranged as back plane wiring connecting each inventoried circuit 106 to central processor 103.

Conclusion

The automatic hardware inventory system is capable of inventorying a wide spectrum of circuits. Entry parameters can be arranged to provide a comprehensive delineation of circuit parameters, such as type, features and functions. Also, the inventorying system discussed herein will work with any number of central processors or computers and can inventory apparatus other than telephone circuits.

Of course, it is obvious to one skilled in the art that the invention disclosed herein is not limited to the embodiment disclosed in the accompanying drawing and foregoing detailed description, but can be rearranged through the substitution, addition and deletion of components and functions without departing from the scope and spirit of the invention.

For example, the arrangement of identifying information programmed into PROM 207 can be rearranged by adding, reducing or deleting bit fields to reflect varied information for identifying features or functions provided by each inventoried circuit or for identifying the type of each inventoried circuit. Further, central processor 103 can be programmed to inventory circuits providing particular features, classes of features, particular functions or classes of functions. Moreover, central processor 103 can be programmed to inventory a particular type of circuit or classes of circuits, for example, telephone outgoing trunks as a particular type of circuit or telephone trunks as a particular class of circuits.

What is claimed is:

1. In a telephone communication system having a processor in communication with a remote terminal over a telephone line and wherein said processor is common to a plurality of system devices and is adapted to control the operation of said devices over a communication path common to said devices, an inventory arrangement comprising:

individual memory means associated with each said device, said memory means having stored therein information bits unique to the identity of said associated device, and means controlled by data supplied by said remote terminal to said processor for enabling selected ones of said memory means to provide said stored unique identity information to said communication path.

* * * * *